United States Patent [19]

Baer

[11] Patent Number: 4,913,985
[45] Date of Patent: Apr. 3, 1990

[54] BATTERY TEMPERATURE REGULATION SYSTEM

[75] Inventor: Stephen C. Baer, Albuquerque, N. Mex.

[73] Assignee: Zomeworks Corporation, Albuquerque, N. Mex.

[21] Appl. No.: 313,684

[22] Filed: Feb. 21, 1989

[51] Int. Cl.⁴ .......................................... H01M 10/50
[52] U.S. Cl. ...................................... 429/50; 429/62; 429/120
[58] Field of Search ................. 429/50, 62, 71, 72, 429/120

[56] References Cited

U.S. PATENT DOCUMENTS

| | | | |
|---|---|---|---|
| 2,364,144 | 12/1944 | Hunsaker | 429/120 X |
| 2,626,971 | 1/1953 | Mansoff | 429/120 |
| 3,110,633 | 11/1963 | Bachmann | 429/120 X |
| 3,708,346 | 1/1973 | Nash | 429/62 |
| 3,834,945 | 9/1974 | Jensen | 429/120 |
| 4,007,315 | 2/1977 | Brinkmann et al. | 429/62 |
| 4,095,938 | 6/1978 | Mikaila | 432/225 |

*Primary Examiner*—Anthony Skapars
*Attorney, Agent, or Firm*—Townsend and Townsend

[57] ABSTRACT

An enclosure for controlling the ambient temperature of a battery by utilizing a quantity of water for heat transfer and thermal mass is disclosed. A housing has a thermally insulated interior defining a cavity which contains the battery. A water container within the cavity is in thermal contact with the battery. A flat radiator with a hollow interior is located proximate the housing above the level of the water container, and has a nearly horizontal orientation. Warm supply and cold supply conduits extend from the hollow interior of the radiator to the interior of the water container. The cold supply conduit extends to a position within the water container relatively below the position to which the warm supply conduit extends.

27 Claims, 2 Drawing Sheets

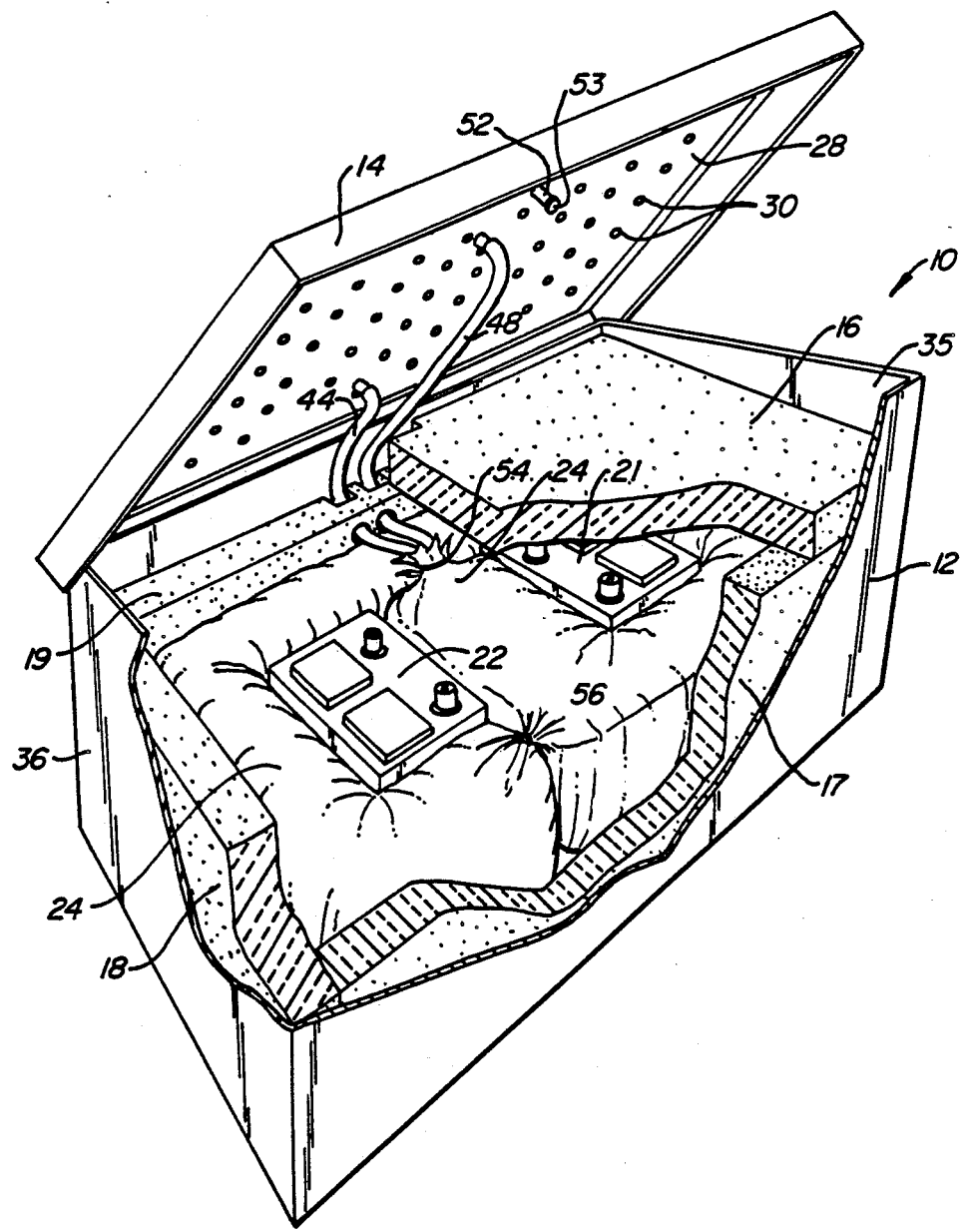
FIG._1.

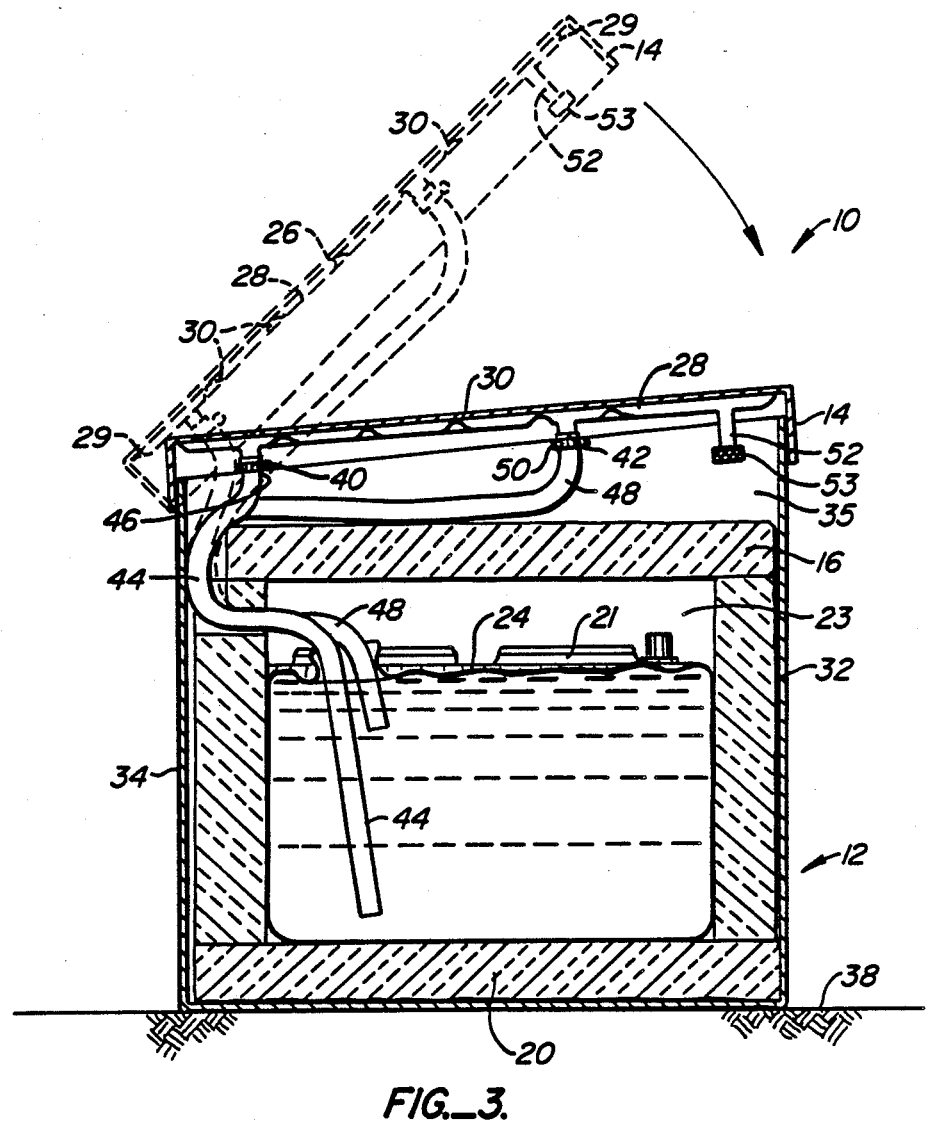
FIG._3.
FIG._2.

BATTERY TEMPERATURE REGULATION SYSTEM

BACKGROUND OF THE INVENTION

This application relates to an enclosure for regulating the temperature of one or more storage batteries.

Batteries are often used in remote locations where electrical power is needed to power lights, communication equipment, and other such devices requiring low level but relatively continuous power. Photovoltaic panels may be used to gather the electrical power when solar energy is available, and the energy stored for later use. Alternatively, generators may be used to generate substantial power during short intervals while the generators are operating, and the electrical energy stored in batteries for longer term use.

Remote batteries and their associated equipment may be exposed to temperature extremes ranging from desert summers where the temperature can reach well over 100 degrees Fahrenheit, to mountain winters where the temperature can plunge to well below Zero. While the equipment can be housed to protect it against rain and sand, such temperature extremes often cannot be avoided. In addition, the equipment is exposed to daily temperature cycles between afternoon highs and early morning lows.

Batteries, particularly the lead acid batteries which are typically used in such installations, are quite sensitive to ambient temperature. At temperatures above 77 degrees Fahrenheit, battery lifetime is substantially shortened. For example, a lead acid battery will age twice as fast at 93 degrees Fahrenheit, and four times as fast at 111 degrees Fahrenheit, as it will age at 77 degrees Fahrenheit. At 40 degrees Fahrenheit, it ages at 60% of the rate at 77 degrees Fahrenheit. Conversely, at colder temperatures, a lead acid battery has less electrical storage capacity, and if it is at a low state of charge, a battery may freeze at temperatures as high as 20 degrees Fahrenheit.

Daily temperature cycles also shorten battery life, especially in a solar energy application. Around midday, when solar energy is at its height, the batteries are often being charged at their maximum rate. Battery charging generates heat both through the exothermic reaction of the electrolyte, and the internal electrical resistance of the battery. This heating occurs at the warmest time of the day, and the temperature excursions of the battery often exceed the excursions in ambient temperature, further reducing battery lifetime.

In remote installations, batteries are typically stored in a metal box which is either directly exposed to the elements, or poorly sheltered. While this protects the batteries from rain and sand, it does little to minimize the temperature extremes imposed on the batteries and may actually aggravate such extremes because heat is trapped in the box. The battery box can be buried, but the value of burying the battery box may be limited. If the batteries are buried no more than 5 feet deep, ground temperature in a desert installation may actually exceed average summer air temperature. Deeper burial is often prohibitively expensive, and makes access and ventilation difficult. No effective solution is found in the prior art to limit both the temperature extremes and the temperature cycles encountered by batteries in remote installations.

SUMMARY OF THE INVENTION

The present invention provides an enclosure for controlling the ambient temperature of a battery by utilizing a quantity of water for heat transfer and thermal mass. A housing has a thermally insulated interior defining a cavity which contains the battery. A water container within the cavity is in thermal contact with the battery. A flat radiator with a hollow interior is located proximate the housing above the level of the water container, and has a nearly horizontal orientation. Warm supply and cold supply conduits extend from the hollow interior of the radiator to the interior of the water container. The cold supply conduit extends to a position within the water container relatively below the position to which the warm supply conduit extends. The water circulates upwardly through the warm supply conduit, through the radiator and downwardly through the cold supply conduit when the temperature of the water is above about 45 degrees Fahrenheit, provided that the temperature of the radiator is below the temperature of the water in the container. Below about 45 degrees Fahrenheit, the water does not circulate, nor will it circulate when the temperature of the radiator is above the temperature of the water.

In the preferred embodiment of the invention, a pair of batteries are stored in the cavity of the enclosure, and a flexible, unpressurized water container surrounds both batteries and occupies the space between them. The radiator comprises two spaced plates forming the top of the housing, one of the plates being dimpled to maintain the desired spacing. The radiator is filled by drawing water into the radiator from the water container through the warm supply and cold return conduits by applying suction. This leaves the water in the radiator at a pressure less than atmospheric, and atmospheric pressure holds the plates together. The plates are not secured to one another except at a circumferential seal and the plates can move apart when the water freezes. As a result, the system can be exposed to almost any temperature environment without suffering permanent damage.

The system of the present invention will radiate heat at night because the water will flow through the radiator due to the thermal siphon effect. The thermal siphon effect is only present when warm water is less dense than cold water (i.e. above about 39 degrees Fahrenheit), and when the temperature of the water in the radiator is less than the temperature of the water in the water container. Accordingly, water circulation will not occur during the day when the radiator is heated by the sun, and heat transfer is always from the interior of the enclosure to the exterior except for the limited heat transfer which can occur through the walls of the enclosure. Also, radiant cooling ends as the temperature of the water falls toward 39 degrees Fahrenheit (actually, the water in the radiator may freeze and stop circulation as height as 45–48 degrees Fahrenheit) and further cooling is undesireable. Heat built up in the enclosure during the day as the batteries are being charged is dampened by the large thermal mass of the water, and is dissipated at night, minimizing the rise in battery temperature. Any rise in temperature inside the enclosure due to higher external temperatures will also be dissipated at night. The radiator is preferrably coated or constructed of a material which is emissive of infrared radiation to maximize black body radiation to the cold night sky. This will allow the temperature of the water to be cooled to several degrees Fahrenheit below ambient temperature to enhance the cooling effect.

In hot environments, the battery temperature should stay below about 80 degrees Fahrenheit in the enclosure of the present invention. The insulation of the enclosure inhibits heat transfer from outside the enclosure, and each night the radiator dissipates the heat built up inside the enclosure during the day. Also, daily temperature excursions are minimized because the thermal mass of the water absorbs much of the heat energy generated by charging the batteries.

In cold environments, circulation of water will have ceased when the water temperature has decreased to about 45 degrees Fahrenheit. Escape of heat from the enclosure will be minimized by the insulation, and the interior of the enclosure will be heated to some degree if the batteries are charged. Cooling of the batteries will be slowed by the thermal mass of the water, and when the water reaches its freezing point, further cooling will be prevented as the water gives up its latent heat until the water has completely frozen. Cooling of the batteries themselves to temperature levels which seriously degrade their effectiveness and useful life is thus effectively prevented in all but the most extreme cold temperature environments.

In most temperature environments, battery temperature will be maintained by the system of the present invention between approximately 35 and 80 degrees Fahrenheit, and in moderate climates, battery temperature will be maintained somewhere around 45 degrees Fahrenheit. This is substantially less than 77 degrees Fahrenheit which is generally considered to be the ideal battery temperature because it balances capacity and aging effect. However, batteries designed for external use must be sized to accommodate the storage necessary at the lowest temperature anticipated, meaning that batteries designed for external use typically have more storage than necessary. With this design constraint, the system of the present invention provides adequate capacity and substantially increases battery life relative to batteries maintained at the ideal constant temperature of 77 degrees Fahrenheit.

The novel features which are characteristic of the invention, as to organization and method of operation, together with further objects and advantages thereof will be better understood from the following description considered in connection with the accompanying drawings in which a preferred embodiment of the invention is illustrated by way of example. It is to be expressly understood, however, that the drawings are for the purposes of illustration and description only and are not intended as a definition of the limits of the invention.

BRIEF DESCRIPTION OF THE DRAWINGS

FIG. 1 is a perspective view of the preferred embodiment of the present invention with the lid raised;

FIG. 2 is a plan view of the preferred embodiment of FIG. 1 with the lid removed;

FIG. 3 is a side section view of the preferred embodiment with the lid closed, with the raised lid position depicted with dashed lines.

DESCRIPTION OF THE PREFERRED EMBODIMENT

The preferred embodiment of the battery enclosure of the present invention is illustrated by reference to FIGS. 1-3. Enclosure 10 includes a metal box 12 open at the top. Box 12 has a lid 14 which is pivotable about one edge to open and close the box. Box 12 and lid 14 are made of heavy gauge steel or other appropriate material suitable to protect the contents of the enclosure from rain, blown sand and the like.

A plurality of insulation panels 16-20 define a thermally insulated cavity 23 within box 12. The top insulation panel 16 is removable for access to cavity 23. A pair of batteries 21, 22 can be located in insulated cavity 23. A water container 24 circumscribes batteries 21, 22, and the space between them and is flush with the exterior surfaces of batteries 21, 22. Water container 24 is made of a flexible plastic material which conforms itself to the available volume when filled with water to be in thermal contact with the batteries. A larger battery box can be used to house three or more batteries, in which event the water container would be entwined around each of the batteries, or multiple water containers could be used with multiple radiators.

Lid 14 includes a radiator formed by an upper steel plate 26 which is part of the lid itself, and a parallel steel plate 28. Plate 28 has a plurality of dimples 30 having a height of about ⅛ inch which prevent plate 28 from collapsing against plate 26, and a hollow space is maintained between the plates. Plate 28 is soldered, epoxied or otherwise bonded to plate 26 around its outer periphery to form a water-tight circumferential seal 29. Plate 28 is not bonded to plate 26 inside seal 29 so that the plates can move apart if necessary to expand the space between them.

Box 12 includes a front wall 32 which is higher than back wall 34. The upper edges of side walls 35, 36 are inclined upwardly toward the front. As a result, plates 26, 28 are inclined slightly from horizontal when lid 14 is closed, as illustrated in FIG. 3. Box 12 must be placed on a horizontal surface such as surface 38 so that lid 14 maintains is slightly inclined configuration.

Plate 26 has a fitting 40 at the low end of lid 14, and another fitting 42 between the low end and the high end of the lid. A flexible conduit 44 is attached to fitting 40 by a clamp 46, and extends to a position near the bottom of water container 24. A second flexible conduit 48 is attached to fitting 42 by a clamp 50, and extends to a position near the top of water container 24. Plate 28 has a third fitting 52 near the high end of lid 14, sealed with an air and water tight cap 53.

Before cap 53 is placed on fitting 52, suction is applied at fitting 52. The suction draws water from container 24 up through conduits 44, 48 and into the space between plates 26, 28, at which point cap 53 is applied. The water between plates 26, 28 will be at a pressure less than atmospheric, and atmospheric pressure on the external surfaces of the plates will force the plates together. The appropriate spacing between plates 26, 28 will be maintained by dimples 30. Water container 24 is unpressurized, and will be under no pressure other than the pressure resulting from the depth of the water.

The radiator provided by plates 26, 28 in combination radiates heat upwardly into the surrounding atmosphere at night. Because the radiator is exposed to the cold night sky it is able to cool the water to well below ambient temperatures, typically 5 to 10 degrees below ambient depending on the water vapor in the atmosphere. Above a water temperature of approximately 45 degrees Fahrenheit, conduits 44, 48 and the radiator formed by plates 26, 28 will form a thermal siphon as long as the radiator is colder than the water in container 24. Water will flow upwardly through conduit 48 (the warm water supply) into the radiator formed by plates 26, 28, downwardly through the radiator, and downwardly through conduit 44 (the cold water return) back to container 24. As the water flows through the radiator, it gives off heat to the cold night sky, cooling the water and hence batteries 21, 22.

Water is at its most dense at about 39 degrees Fahrenheit but as it cools toward this point, the change in density with changing temperature decreases and the viscosity increases. The weakening thermal siphon effect and the increased resistance to flow slow the circulation and allow the water in the radiator to freeze, stopping the movement of water while the water in container 24 is at a temperature of 45 to 48 degrees Fahrenheit. The density inversion effect found only in water and heavy water is essential to the operation of the system and therefore water, or water insufficiently diluted to alter its density inversion properties, must be used as the cooling liquid.

Below a water temperature of about 45 degrees Fahrenheit, further cooling of the batteries is retarded by the thermal absorption of the water itself. At the freezing point of the water, the water will provide substantial thermal mass which must be overcome before the temperatures of the batteries can be further reduced. In a typical installation for two batteries, approximately 40 lbs. of water will be used, requiring 5,760 btu to freeze. If the box is well insulated, losing 2 btu per degree Fahrenheit, 120 degree-days below freezing are required to reduce the battery temperature below the freezing point of water. Thus, sustained low temperatures will be required before the temperature of the batteries themselves will decrease below freezing. Because the radiator can expand when the water freezes, and container 24 and conduits 44, 48 are flexible and also expand when the water freezes, there is no permanent damage to the system even in the unlikely event that the water freezes completely. Given the internal heating that the batteries generate during charging, and the fact that this heat is retained by the insulated housing, enclosure 10 will usually maintain the batteries at a sufficient temperature operate relatively efficiently even at sustained cold temperatures.

In operation, a pair of batteries 21, 22 are inserted within box 12, and are surrounded by a water container 24 filled with water. Water container 24 is flush with all sides of the batteries to optimize cooling. Cold return and warm supply conduits 44, 48 are inserted into one end of water container 24, which is then tied with band 54. The other end of water container 24 is gathered with a second band 56 to prevent leakage of the water. Suction is applied to fitting 52 to fill the conduits and the interior of the radiator formed by plates 26, 28 with water, after which fitting 52 is sealed with cap 53.

The thermal siphon effect provided by the system will cool the water as long as the water temperature is above about 45 degrees Fahrenheit and the radiator temperature is below the water temperature. This will maintain the insulated interior cavity 23 at a temperature 25 typically below average ambient when the average ambient temperature exceeds about 50 degrees Fahrenheit. This lower temperature, achieved during night cooling, will be maintained notwithstanding the heat caused by the charging of the batteries, and the heat flux during the day which penetrates insulating panels 16-20. When the average ambient temperature is well below 32 degrees Fahrenheit, the water in container 24 will start to freeze, limiting the decrease in temperature of the batteries themselves. While a preferred embodiment of the present invention has been illustrated in detail, it is apparent that modifications and adaptations of that embodiment will occur to those skilled in the art. However, it is to be expressly understood that such modifications and adaptations are within the spirit and scope of the present invention, as set forth in the following claims:

What is claimed as new is:

1. An enclosure for a controlling the ambient temperature of a battery utilizing a quantity of water for thermal transfer and thermal mass, said enclosure comprising:
    a housing having a thermally insulated interior defining an internal cavity adapted to contain a battery;
    a water container within the cavity in thermal contact with the battery;
    a flat radiator with a hollow interior having a nearly horizontal orientation located proximate the housing above the level of the water container; and
    warm supply and cold return conduits extending from the hollow interior of the radiator to the interior of the water container, the cold return conduit extending to a position within the water container relatively below the position to which the warm supply conduit extends so that water occupying the water container, the conduits and the hollow interior of the radiator circulates upwardly through the warm supply conduit, through the radiator and downwardly through the cold return conduit when the temperature of the water is above about 45 degrees Fahrenheit and the temperature of the radiator is less than the temperature of the water in the water container, and circulation of the water ceases below a water temperature of about 45 degrees Fahrenheit and when the temperature of the radiator is greater than the temperature of the water in the water container.

2. The enclosure of claim 1 wherein the radiator is integral with the upper surface of the housing.

3. The enclosure of claim 1 wherein the water container is flush with the battery.

4. The enclosure of claim 3 wherein the water container surrounds the battery.

5. The enclosure of claim 1 wherein the water container is constructed of flexible plastic material.

6. The enclosure of claim 1 wherein the water container is unpressurized, and the water in the radiator is at a pressure less than atmospheric pressure.

7. The enclosure of claim 1 wherein the interior cavity of the housing is adapted to contain a pair of batteries, and wherein the water container is at least partially located between the batteries and is flush with each said battery.

8. The enclosure of claim 7 wherein the water container surrounds and extends between both said batteries.

9. The enclosure of claim 1 wherein the radiator is inclined from horizontal so that the radiator has a high end and a low end.

10. The enclosure of claim 9 wherein the warm supply and cold return conduits each include a metal fitting coupling each said conduit to the radiator, the cold return fitting being located proximate the low end of the radiator and the warm supply fitting being located intermediate the high and low ends of the radiator.

11. The enclosure of claim 1 wherein the radiator includes upper and lower substantially flat, spaced plates circumferentially sealed to one another to form the hollow interior.

12. The enclosure of claim 11 wherein the radiator includes a fill port to which suction is applied to draw water into the radiator through the warm supply and cold return conduits to fill the radiator, and means for sealing the fill port after the radiator has been filled with water to maintain the pressure of the water in the radiator at less than atmospheric pressure.

13. The enclosure of claim 12 wherein one of the plates has projections extending to the other said plate to maintain the spacing between the plates.

14. The enclosure of claim 11 wherein the plates are not connected to one another except at the peripheral seal to allow expansion of the space between the plates when the water freezes.

15. The enclosure of claim 11 wherein the edge of one said plate is soldered to the other said plate to form the circumferential seal.

16. An enclosure for controlling the ambient temperature of a plurality of batteries utilizing a quantity of water for thermal transfer and thermal mass, said enclosure comprising:
  a housing having a thermally insulated interior defining an internal cavity adapted to contain a plurality of batteries, the upper portion of said housing including a pair of spaced plates forming a radiator with a hollow interior, said spaced plates being inclined from horizontal so that the radiator has a high end and a low end;
  a flexible water container within the cavity in thermal contact with each of the batteries; and
  warm supply and cold return conduits extending from the hollow interior of the radiator to the interior of the water container, the cold return conduit extending from proximate the low end of the radiator to a first position within the water container and the warm supply conduit extending from between the low and high ends of the radiator to a second position within the water container relatively above the first position so that water occupying the water container, the conduits and the hollow interior of the radiator circulates upwardly through the warm supply conduit, through the radiator and downwardly through the cold supply conduit when the temperature of the water is above about 45 degrees Fahrenheit and the temperature of the radiator is less than the temperature of the water in the water container, and circulation of the water ceases below a temperature of about 45 degrees Fahrenheit and when the temperature of the radiator is greater than the temperature of the water in the water container.

17. The enclosure of claim 16 wherein the water container comprises an elongate plastic sleeve surrounding each of the batteries which is sealed at one end, and which has an opening at its opposite end above the level of the water, the warm supply and cold return conduits passing through said opening.

18. The enclosure of claim 16 wherein one of the plates has a fill port to which suction is applied to draw water into the radiator through the warm supply and cold return conduits to fill the radiator, and means for sealing the fill port after the radiator has been filled with water to maintain the pressure of the water in the radiator at less than atmospheric pressure.

19. The enclosure of claim 18 wherein one of the plates has projections extending to the other said plate to maintain the spacing between the plates.

20. The enclosure of claim 19 wherein the spaced plates have a peripheral seal, and wherein the spaced plates are not connected to one another except at the peripheral seal to allow expansion of the space between the plates when the water freezes.

21. An enclosure for controlling the ambient temperature of a battery utilizing a quantity of water for thermal transfer and thermal mass, said enclosure comprising:
  a housing having a thermally insulated interior defining an internal cavity adapted to contain the battery, the upper portion of said housing including a pair of spaced plates peripherally sealed to one another and forming a radiator with a hollow interior, said spaced plates being inclined from horizontal so that the radiator has a high end and a low end;
  a flexible, unpressurized water container within the cavity surrounding and flush with the battery;
  warm supply and cold return conduits extending from the hollow interior of the radiator to the interior of the water container, the cold return conduit extending from proximate the low end of the radiator to a first position within the water container and the warm supply conduit extending from between the low and high ends of the radiator to a second position within the water container relatively above the first position;
  means attached to the radiator for applying suction to the hollow interior thereof to draw water upwardly through the warm supply and cold return conduits and into the radiator to charge the system; and
  means for sealing the suction means to maintain the pressure of the water in the radiator at less than atmospheric pressure, whereby water occupying the water container, the conduits and the hollow interior of the radiator circulates upwardly through the warm supply conduit, through the radiator and downwardly through the cold supply, when the temperature of the water is above about 45 degrees Fahrenheit and the temperature of the radiator is less than the temperature of the water in the water container, and circulation of the water ceases below its water temperature of about 45 degrees Fahrenheit and when the temperature of the radiator is greater than the temperature of the water in the water container.

22. The enclosure of claim 21 wherein the suction means comprises a fill port attached to one of the plates, and wherein the sealing means comprises a cap applied to the fill port.

23. The enclosure of claim 21 wherein one of the plates has projections extending to the other said plate to maintain the spacing between the plates.

24. The enclosure of claim 21 wherein the plates are not connected to one another except at the peripheral seal to allow expansion of the space between the plates when the water freezes.

25. The enclosure of claim 21 wherein the interior cavity of the housing is adapted to contain a pair of batteries, and wherein the water container is at least partially located between the batteries and is flush with each said battery.

26. The enclosure of claim 25 wherein the water container surrounds and extends between said batteries.

27. A method for controlling the ambient temperature of a battery comprising:

providing a housing having a thermally insulated interior defining an internal cavity adapted to contain the battery;

providing a flexible water container within the housing in thermal contact with the battery;

providing a radiator including pair of spaced plates peripherally sealed and having a hollow interior;

locating the spaced plates above the level of the water container proximate the housing and inclined from horizontal so that the radiator has a high end and a low end;

extending warm supply and cold return conduits from the hollow interior of the radiator to the interior of the water container so that the cold return conduit extends from proximate the low end of the radiator to a first position within the water container, and the warm supply conduit extends from between the high and low ends of the radiator to a second position within the water container relatively above the first position;

filling the fluid container with water;

drawing the water upwardly through the warm supply and cold return conduits into the hollow interior of the radiator by applying suction to a fitting attached to the radiator; and sealing the fitting so that the water in the radiator is maintained at less than atmospheric pressure, whereby the water circulates upwardly through the warm supply conduit, through the radiator and downwardly through the cold return conduit when the temperature of the water is above about 45 degrees Fahrenheit and the temperature of the radiator is less than the temperature of the water in the water container, and circulation of the water ceases below a water temperature of about 45 degrees Fahrenheit and when the temperature of the radiator is greater than the temperature of the water in the water container.

* * * * *